United States Patent
Lemaster et al.

(10) Patent No.: US 9,578,005 B2
(45) Date of Patent: Feb. 21, 2017

(54) AUTHENTICATION SERVER ENHANCEMENTS

(71) Applicants: Robert K Lemaster, San Jose, CA (US); Duleep G Pillai, Cupertino, CA (US)

(72) Inventors: Robert K Lemaster, San Jose, CA (US); Duleep G Pillai, Cupertino, CA (US)

(*) Notice: Subject to any disclaimer, the term of this patent is extended or adjusted under 35 U.S.C. 154(b) by 200 days.

(21) Appl. No.: 14/500,170

(22) Filed: Sep. 29, 2014

(65) Prior Publication Data

US 2015/0113589 A1    Apr. 23, 2015

Related U.S. Application Data

(60) Provisional application No. 61/885,488, filed on Oct. 1, 2013.

(51) Int. Cl.
H04L 29/06    (2006.01)

(52) U.S. Cl.
CPC ........... H04L 63/08 (2013.01); H04L 63/0281 (2013.01); H04L 63/20 (2013.01)

(58) Field of Classification Search
CPC ....... H04L 63/08; H04L 63/0281; H04L 63/20
See application file for complete search history.

(56) References Cited

U.S. PATENT DOCUMENTS

| | | | | |
|---|---|---|---|---|
| 6,826,698 B1* | 11/2004 | Minkin | ............... | H04L 63/0263 709/223 |
| 7,249,374 B1* | 7/2007 | Lear | ........................ | G06F 21/31 709/203 |
| 7,342,906 B1* | 3/2008 | Calhoun | ............. | H04L 63/0892 370/310 |
| 7,430,590 B1* | 9/2008 | Rive | ........................ | H04L 29/06 709/203 |
| 7,627,667 B1* | 12/2009 | Rive | ................... | G06F 11/0748 709/224 |
| 7,934,258 B2* | 4/2011 | Wahl | ........................ | G06F 21/55 713/184 |
| 8,146,160 B2* | 3/2012 | Orr | ...................... | H04L 63/0209 713/168 |
| 8,627,438 B1* | 1/2014 | Bhimanaik | .............. | H04L 63/10 726/9 |
| 2002/0144154 A1* | 10/2002 | Tomkow | .............. | H04L 12/5875 726/1 |

(Continued)

*Primary Examiner* — Dao Ho
*Assistant Examiner* — Cheng-Feng Huang

(57) ABSTRACT

A set of authentication server configuration rules are implemented. The authentication server configuration rules utilize regular-expression based commands. A running log of commands entered by every user is maintained for each command is run by the at least one authentication server. A configuration diff command is run each time a session ends. A set of actions of an authentication-server administrator on the authentication server is tracked. The set of actions of the authentication-server administrator is stored in a log. The log includes a username of the authentication-server administrator who generated the log and a time source and a time zone associated of a location of the set of actions. A hash algorithm is run on the log. A portable document format (PDF) formatted the of the log is generated. A list of usernames is generated from a set logs that filled a user-authentication process required to access the authentication server.

10 Claims, 5 Drawing Sheets

(56) References Cited

U.S. PATENT DOCUMENTS

| | | | | |
|---|---|---|---|---|
| 2004/0117731 A1* | 6/2004 | Blyashov | G06F 17/211 | 715/222 |
| 2004/0186996 A1* | 9/2004 | Gibbs | H04L 63/123 | 713/168 |
| 2004/0255167 A1* | 12/2004 | Knight | G06Q 10/10 | 726/24 |
| 2006/0072583 A1* | 4/2006 | Sanda | G06F 21/316 | 370/395.53 |
| 2007/0150940 A1* | 6/2007 | Gilek | G06F 21/6245 | 726/4 |
| 2008/0005558 A1* | 1/2008 | Hadley | H04L 9/3242 | 713/159 |
| 2008/0046966 A1* | 2/2008 | Rhoades | H04L 63/08 | 726/2 |
| 2008/0141339 A1* | 6/2008 | Gomez | H04L 63/08 | 726/1 |
| 2008/0307515 A1* | 12/2008 | Drokov | G06Q 20/32 | 726/7 |
| 2009/0049196 A1* | 2/2009 | Smith | H04L 63/08 | 709/245 |
| 2009/0129301 A1* | 5/2009 | Belimpasakis | H04W 28/18 | 370/310 |
| 2009/0231615 A1* | 9/2009 | Itami | G06F 21/608 | 358/1.15 |
| 2009/0313582 A1* | 12/2009 | Rupsingh | G06Q 10/10 | 715/835 |
| 2010/0077447 A1* | 3/2010 | Dholakia | H04L 63/08 | 726/3 |
| 2011/0055900 A1* | 3/2011 | Chua | H04L 63/08 | 726/4 |
| 2012/0131653 A1* | 5/2012 | Pasquero | G06F 21/34 | 726/6 |
| 2012/0174196 A1* | 7/2012 | Bhogavilli | H04L 63/1458 | 726/5 |
| 2012/0198535 A1* | 8/2012 | Oberheide | H04L 63/0272 | 726/9 |
| 2012/0210126 A1* | 8/2012 | Johnson | G06F 17/30 | 713/165 |
| 2012/0246645 A1* | 9/2012 | Iikura | G06F 8/61 | 718/1 |
| 2012/0260329 A1* | 10/2012 | Suffling | H04L 63/1458 | 726/9 |
| 2013/0331027 A1* | 12/2013 | Rose | H04W 12/06 | 455/41.1 |
| 2014/0282893 A1* | 9/2014 | Sheller | H04L 63/08 | 726/4 |

* cited by examiner

AUTHENTICATION SERVER ENHANCEMENTS

CROSS-REFERENCE TO RELATED APPLICATIONS

This application is a claims priority from U.S. Provisional Application No. 61/885,488, titled AUTHENTICATION SERVER ENHANCEMENTS and filed 1 Oct. 2013. This application is hereby incorporated by reference in its entinity.

FIELD OF THE INVENTION

The invention is in the field of network administration and more specifically to a method, system and apparatus of authentication server enhancements.

DESCRIPTION OF THE RELATED ART

An authentication server can be used for central management of network elements. An authentication server can provide a network service that applications use to authenticate the credentials, usually account names and passwords, of their users. For example, when a client submits a valid set of credentials, it receives a cryptographic ticket that it can subsequently use to access various services. Authentication servers can also provide authorization and/or accounting services for users who access a network, as well as, administer a network. Following are some unique features that may be added to an authentication server to further improve the system's functionality. In view of this, improvements may be made over conventional methods of authentication servers.

BRIEF SUMMARY OF INVENTION

In one aspect, a set of authentication server configuration rules are implemented. The authentication server configuration rules utilize regular-expression based commands. A running for of all commands entered b every user is maintained for each command is run by the at least one authentication server. A configuration diff command is run each time a session ends. A set of actions of an authentication-server administrator on the authentication server is tracked. The set of actions of the authentication-server administrator is stored in a log (e.g. in data store 108). The log includes a username of the authentication-server administrator who generated the log and a time source and a time zone associated of a location of the set of actions. A hash algorithm is run on the log. A portable document format (PDF) formatted file of the log may be generated. A list of all usernames is generated from a set logs that failed a user-authentication process required to access the authentication server. When a specified amount of failed authentication attempts from a single remote internet protocol (IP) address are detected, all authentication attempts from IP address are blocked for a specified period of time. An authorized IP address list is added as part of an access control list to a user record, wherein the access control list allows the user record's username to access the authentication server from specified remote user hosts or subnets. A mobile device application is provided that enables the authentication-server administrator. The mobile device application enables the authentication-server administrator to monitor and access a mobile server with access to the authentication server. The authentication server and the mobile device application authenticate to the mobile server over a secured connection.

Optionally, regular expressions are used to match on host names of clients instead in lieu an internet protocol (IP) address client identifier. The configuration diff command may be emailed to the authentication-server administrator. The user record includes an access-control list of specified client devices that can access the authentication server when also associated with the authorized IP address. The authentication server sends alerts to the mobile device application through the mobile server, wherein the alert comprises information about an authentication server maintenance report, an authentication server access log or an authentication server view statistic.

BRIEF DESCRIPTION OF THE DRAWINGS

The present application can be best understood by reference to the following description taken in conjunction with the accompanying figures, in which like parts may be referred to by like numerals.

Figure 1:
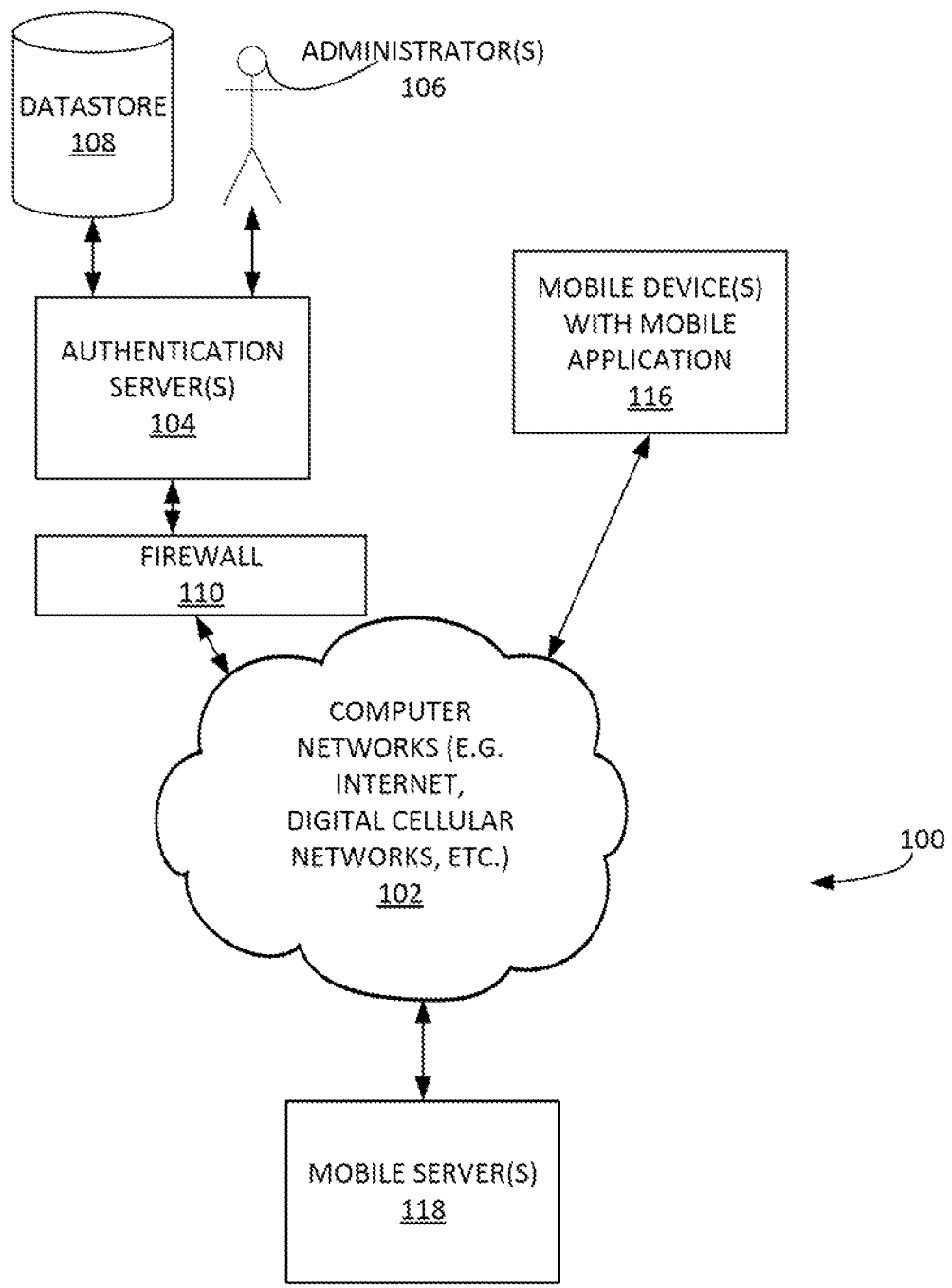
FIG. 1 depicts, in block diagram format, an example authentication server enhancement system, according to some embodiments.

The Figures described above are a representative set, and are not an exhaustive with respect to embodying the invention.

DETAILED DESCRIPTION

The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments. Thus, the various embodiments are not intended to be limited to the examples described herein and shown.

Reference throughout this specification to "one embodiment," "an embodiment," "some embodiments", "one example", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc, to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The depicted order and labeled steps of process described herein are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Ajax (asynchronous JavaScript and XML) is a group of technologies which can be used to dynamically display and allow the user to interact with information from a server in the background without interfering with the display and behavior of the existing page.

'App' or 'Ap' are short for 'Application', which is a frequently used name for software that runs on a smart phone or tablet.

A Boolean expression uses operators OR, AND, and NOT and other operators to match on data. It is often used in search engines.

Client or device or network element refers to a router, switch, firewall, or other device that a Remote User is attempting to access. The Client sends the Remote User's username and password to the authentication server 104 (e.g. TACACS+ or RADIUS, etc.) and the authentication server 104 can reply back to the Client with whether the remote user is authorized and the details of the Remote User's authorization level.

Diff or delta is a term to compare two files and output the differences between the files.

Digital signature is a mathematical scheme for demonstrating the authenticity of a digital message or document. Digital signatures are used to detect forgery or tampering.

DoS (Denial of Service) is any attack type that prevents use of a system by its legitimate users.

FTPS (File Transfer Program Secure) is a form of secure file transfer that uses Transport Layer Security (TLS) and the Secure Sockets Layer (SSL) cryptographic protocols.

Grep (Global Regular Expression Print) is a utility for searching text using pattern matching.

GUI stands for Graphical User Interface. For the purposes of this document, the GUI refers to a graphical web interface that would be accessed with a web browser.

A Hacker is a malicious user who is attempting to gain access to or exploit a system that he or she is not authorized to use, or exceeding his/her privileges on a system. A hacker can also mean someone who is curious about computers and likes to take them apart, reverse engineer them, or improve them. For this document, the tennis used to identify a malicious user.

IP Address is a numerical address designating a computer.

Multi-Factor Authentication (sometimes also called Two-Factor Authentication) is a method of authentication that combines multiple elements; something you know (like a password), plus something you have (like a smartphone); or something you are (like a biometric scan).

NAS stands for Network Access Server. This term is used interchangeably with Client which is the device that a Remote User is attempting to authenticate to.

PDF stands for the Adobe Portable Document Format which is used to represent documents in a manner independent of application software, hardware, and operating systems.

A Proxy is a configuration where one system acts on behalf of another. In Authentication, a request may be sent to one server, which then forwards the request to another server and then replies back to the initiating system. In this scenario, the first server is acting as a proxy for the second server. The second server in this scenario may be chosen based on the policy on the first server and the IP address or username sent from the requesting device.

RADIUS (Remote Access Dial In User Service) is a network protocol used for Authentication, Authorization, and Accounting (AAA) used primarily for remote connections into a network. It can also be used for AAA services to devices such as routers and switches.

Regex is an abbreviation for Regular Expressions, a syntax used for pattern matching.

Remote User or End User refers to a human at the beginning of a communication chain. In Authentication, the Remote User is the person or host who is attempting to authenticate to a router or some other authentication server 104 enabled device.

SCP stands for Secure Copy a utility for securely transferring files based on the SSH protocol.

S/FTP is a method of securely transferring files over SSH.

SNMP (Simple Network Management Protocol) is a standard protocol for managing devices on IP networks. It is used to Monitor devices, alert on relevant events, and manage their configurations.

SSH (Secure Shell) a protocol for secure logins between two networked computers.

Subnet is a logical subdivision of a network based on IP Addresses.

TACACS+ (Terminal Access Controller Access Control System Plus) is a protocol used for Authentication, Authorization, and Accounting (AAA) to devices such as routers, switches, and firewalls. TACACS+ centralizes control over network elements, simplifying administration and increasing security for a computer network. The main advantage of TACACS+ over RADIUS is it separates out the Authorization functionality which makes is much more effective than RADIUS when imaging network elements.

Tail is a command line utility used to display the last few lines of a file.

TFTP (Trivial File Transfer Protocol) is a simple and lightweight file transfer protocol used to transfer tiles over internal networks.

Example Systems

FIG. 1 depicts, in block diagram format, an example authentication server enhancement system 100, according to some embodiments. Disclosed are a set of additional functionalities to enhance the operation of an authentication server 104.

In some embodiments, regular expressions can be used to simplify the configuration of authorization rules. This would enable the administrator to make a permit or deny statements based on a partial command, an entire command, subcommand, or arguments. Some authentication servers 104 can only create a permit/deny statement based on a command and an argument. With regular expressions, the administrator can create a permit/deny statement on any part of the command. Some authentication servers 104 can use two separate lines to include a negative command. With regular expressions, the Administrator 106 can do this with one line. Regular expressions can also be used to match on host names of clients instead of adding each client manually by IP address. In a very simple example, an administrator can classify all clients with a hostname beginning with "router" and ending in a number as a certain type of client, and all clients with a hostname beginning with "switch" and ending in a number can be classified as a separate type of client. Regular expressions can be used to match on an IP address. In some circumstances where networks are divided into multiple subnets, the final octet of the IP address is sometimes used as a standard to define the type of host for example, the final octet of an IP address being .1 may indicate a gateway on each subnet. By creating a regular expression based on the IP address string, the administrator could avoid creating a unique client entry for each client. Example regular expressions used in client configurations can include, inter alia: 192.168.1,1 (this matches a single IP address); 192.168.*(this can match all IP addresses beginning with 192,168); 192,168.1.1-192.168.1,255 (this can match all IP addresses in the specified range); 192.168.0.0/16 (this can match all IP addresses in the specified Classless Inter-Domain Routing (CIDR) format); 192,168.1.0/255.255.255.0 (this can match all IP addresses provided IP-Subnet configuration; ^OrgSwitch-a.* (this can match all hostnames with the prefix 'OrgSwitch-a'; ^switch 1$ (this matches a hostname 'switch 1'); switch (this matches any hostname which has the word 'switch' included there). Regular expressions used in authorization steps can include, inter alia: <Permit>show bgp .*<Permit> (his can allow all commands that start with show Border Gateway Protocol (BGP); <Permit>.*show.*<Permit> (this can allow all show commands); and/or <Deny>.*<Deny> (this can deny all commands).

There are tools that can automatically log into a device on a set schedule, download the configuration, compare the configuration to previous versions, and highlight changes. This is frequently called a "diff" or a "delta". Sometimes, they can estimate who made those changes, but you would usually have to compare to another tool (like system logs or TACACS+) to find out who made the changes. This is because multiple people could have been logged into the device between the scheduled diffs.

The authentication server 104 keeps a running log of all commands entered by every user as they are run. By combining the diff functionality with the existing authentication server 104 accounting functionality, the logs can include the commands entered as well as what has changed from the previous configuration and the exact user that made the changes. This information may include the date, time, and username for every command entered.

Instead of checking the configurations on a set schedule, the software can run configuration diffs each time a session ends. A session is ended either by the user logging out of the device, disconnecting, or when the device closes a session due to inactivity by the user. When a session ends, the network device can send an accounting stop message to the authentication server 104 and that can trigger running the diff. By doing this, the system 100 can definitively show which users made the configuration change. In addition to storing the configuration diff, it may be emailed to the authentication server 104 administrator and/or the administrator that made the changes.

When software like this is configured, the administrator has to set up and maintain a list of clients, IP addresses, device types, usernames and passwords, etc. When combined with an authentication server, this can be already done in the authentication server 104 settings. All the Administrator 106 needs to do is add one line in the client configuration identify the type of device (which tells the system 100 which script to run), and the rest is done. This can save time and money because this is one less system to manage.

In addition to the configuration diff, the system may be configured to log in and download copies of the configuration files to the authentication server 104 on a set schedule using protocols such as TFTP, SCP, S/FTP, or FTPS.

Because the authentication server 104 is downloading and storing the configurations, it may also check these configurations against known best practices and security baselines and alert the Administrator 106 when it finds a configuration that deviates from these best practices. The Server may have standard baselines included with the system 100 and allow the Administrator 106 to enable, disable, or create their own baselines for these configuration checks.

The system 100 can include a search engine functionality to the web interface to simplify this for the administrator. This may include Boolean Operators such as AND, OR, and NOT to refine search queries and correlate changes. The system 100 may also include an Ajax-type functionality to present recently used queries or to provide alternatives that the administrator may use for the query.

The accounting functionality of authentication server 104 is used to track the actions of administrators on a device. This can be used for maintaining security and compliance. Text-based logs may easily manipulated. It can be difficult to prove that the logs haven't been manipulated. In some embodiments, the system 100 may run a hash algorithm on the logs to show that they haven't been changed. A cryptographic hash function can be used to map digital data of arbitrary size to digital data of fixed size. This is can be used to verify the original message has not been modified. The system 100 may generate Adobe PDF (Portable Document Format) formatted files of these logs. This file format can be signed using a digital certificate from the authentication server. This digital certificate can be used to demonstrate that the logs were generated by the system 100 itself and have not been manipulated. The output may additionally show the username of the administrator who generated the log and the time source and time zone so that the logs can have more context for the reader.

Malicious users can frequently attempt to log into devices using lists of common usernames and passwords (e.g. root, admin, etc.). Even if these accounts don't exist, it can create a lot of hits to backend databases, and till up logs, creating an additional drain on resources. In some embodiments, the system 100 may use a list of usernames which can be read before checking the backend database. Any authentication request using a username in the list can fail. The requests could still be logged, but would not be used in charts or alerts. This can conserve resources and speed up the authentication server. Additionally, a delay in the response could be added or the request could be ignored to make things more difficult for the attacker.

In some embodiments, the authentication serve 104 may provide the Administrator 106 a way to import all usernames from the logs that have failed authentication requests above a specified threshold. This may be done by implementing a button, link, or command to import the list. The server may order this list, remove duplicates and remove any legitimate usernames automatically.

Rate limiting slows down hackers and mitigates Denial of Service attempts. By limiting the responses to questionable remote users, it can free up resources for legitimate users. This can be done by limiting all requests from a specified remote user to a specified number of attempts for a period of time (for example, only allowing 3 login attempts every 30 seconds), or it can be implemented by number of failed authentication request. For example, after the first authentication failure, introduce a delay of 1 second, after the second failure, introduce a delay of 2 seconds, after the third failure, add a delay of 3 seconds, etc. This would only be applied to the questionable remote user and would not affect other users. This would not be very noticeable to a human user, but could slow clown automated scripts used by hackers significantly. This could also encourage legitimate users to slow down and think about their correct username and password so that they don't exceed the number of failures which could cause their account to be locked. If this functionality is used, the administrator can also have to consider the default timeout configured for the client (normally about 5 seconds) and adjust it if needed.

A malicious user may try many combinations of usernames and passwords attempting to authenticate to a device. The malicious user may try lists of usernames and passwords on many different devices in a network attempting to get in. Not only can this be used to gain unauthorized access to a system, but it can also cause a legitimate account to get locked if a legitimate username is used, thus creating a Denial of Service. When the system 100 sees a specified amount of failed authentication attempts from a single remote IP address, the system 100 may then block all authentication attempts from that remote user's IP address for a specified period of time. This means that that malicious user cannot be able to authenticate to any authentication server 104 enabled device anywhere in the network for that period of time even if the malicious user is able to guess a correct username and password. The system 100 may add a delay to the authentication response or not respond at all to make things even more difficult for the attacker.

In an authentication request, most authentication clients can include the remote IP address with the client IP address. The client IP address is the system 100 that is sending the request to the Server, the remote IP address is the IP address of the User that is requesting to authenticate. The geographic source of most IP addresses is known based on the service provider that uses those IP addresses. By using this information, the Server may create permit or deny rules based on country or region.

There are organizations that maintain lists of IP addresses of systems that are suspected of being compromised, or are known to be used by hackers. By using this information, the Server may create or permit or deny rules based on being on this list.

A privileged role account can run automated scripts against devices for provisioning or monitoring. These accounts may have very high privileges and could cause damage if the username and password were compromised. The system 100 may add an authorized IP Address list or Access Control List as a part of the user record that can prevent that username from being used except from specified remote user hosts or subnets. This user record may also include an Access Control List of client devices that this username may authenticate to. If this username is used to authenticate to devices that are not in the authorized list, authentication can fail.

In some embodiments, a mobile application that can be run from a smart phone or other mobile device that can enable the authentication server 104 administrator to monitor the servers and troubleshoot common issues. This application may send the Administrator 106 critical alerts, monitor system health, allow the administrator to search logs, view statistics, and run some basic diagnostic tools. In some embodiments, the Administrator 106 may be able to configure separate options or alerts that are available to each mobile user. Because authentication servers 104 should be run from inside a private network without any access from the Public Internet, the application may not be able to connect directly to the authentication server. In order to facilitate this connection, the authentication server 104 can establish a secured outbound connection to a server that can be accessed by the mobile application and the authentication server. FIG. 1 shows an example network architecture diagram showing this functionality. The master authentication server 104 and the mobile application can authenticate to the mobile servers over a secured connection. Once that is in place, the authentication server 104 can be able to send alerts through the mobile servers to the user's mobile device 116, and the user can be able to monitor the health of the servers, access logs, view stats, and send commands through the mobile servers to the authentication server. Mobile device 116 can communicate with mobile device servers 118 for additional functionalities (e.g., mobile device user authentication, mobile device application updates/downloading, etc.)

In some embodiments, the mobile servers may be configured to send test authentications or other commands to the authentication servers 104 in order to verify the operation of the system 100. These tests may be run continually, and if the authentication server 104 fails to reply within the expected period of time, the mobile servers may send an alert to the Administrator 106's mobile device 116. The results may also be stored and used for statistics on general health of the authentication server.

Multi-Factor authentication can be cumbersome when using a mobile application. To address this, the system 100 may add a Device Authentication Code (DAC). The mobile application can generate a random code that is unique to that device. This code can become the DAC. The DAC can only be generated by the Ap. It cannot be entered manually by a user. The DAC can be added to the authentication server. When the mobile application authenticates, it can send the administrator username, password, authentication server 104 identifier, and the DAC as a part of the authentication sequence. The authentication server 104 may then be configured to only allow devices with an authorized DAC to authenticate. Because the DAC is generated by the mobile application and cannot be manually added, the authentication server 104 knows that it is being sent by an authorized device.

The Administrator 106 may want to know when a particular command is entered on a device or group of devices. This command may be authorized, but the Administrator 106 can still want to know when the command is used. Authorization may not be used for that device, so an authorization rule to block it is not available. A functionality may be supported where the Administrator 106 may configure the System 100 to send an alert via SNMP Trap, Syslog alerts, email, SMS message or other message type or run a script when the Server sees this command in the Accounting logs. It may include the time and date, username, hostname, IP address of the person who entered the command, and the host name or IP address of the device it was entered on.

In some cases, an Administrator 106 may warn to have the flexibility to block certain commands on certain devices by default, but still allow them in an emergency or for a specified purpose, such as a maintenance window. In this case, the Administrator 106 may manually override the authorization policy for a user or a group of users on a device or group of devices. This may be a one-time authorization, it may be for a period of time, or for a date range in the future. Once the time period has lapsed, the Users' authorization would automatically return to the previous settings. The User may have the ability to request these commands or privilege level in advance through a functionality on the authentication server, and have that request routed to a Manager for approval.

In a proxy configuration, a request may be sent to one server, but that server then forwards that request to another server. That second server may be maintained by a different Administrator 106 or organization with a different security policy. In some embodiments, the first server may be able to verify the security policy of the second server before permitting any authentications. This security policy may include the number of active users, password rotation, password length and complexity, multi-factor authentication settings, or other settings. If the security policy does not meet the standards of the first server, the authentication can be rejected.

Troubleshooting common issues can take up a lot of the Administrator 106's time. Empowering the User to diagnose and troubleshoot their own issues can reduce the level of effort necessary to manage the system 100 and speed resolution to problems. In some embodiments, Users may be able to log into the system 100 to view their own logging, error messages, or configuration changes. The system 100 may even allow the User to submit trouble tickets directly from the system 100 itself. When combined with logging on the system 100, the User may be able to diagnose and fix their own problems, or continue to submit them to an Administrator 106. The Administrator 106 can be able to see the logs pertaining to that particular request within the trouble ticket without looking them up separately. This may include step-by-step instructions on diagnosing common problems. This may include resetting, or resending passwords.

Users frequently forget their passwords. Resetting passwords can create an administrative burden for the Administrator 106 because the Administrator 106 has to verify their identity and send them a new password securely. In some embodiments, a User may be able to reset their own password from the authentication server. This may be done by sending the User an email with a URL to a SSL protected server, or by sending an SMS message with a reset code or a combination of the above. These URLs or reset codes may only be used once and can only work for a specified period of time before being deactivated. This step may also use authorization by the Administrator 106.

To show the end user that the link is legitimate, a bona fide can be sent with the URL or SMS message. It may be a random word, color, or image or a combination of the three, and then when they go to the secured site, they can see that word, color, or image. That way, they know it is legitimate and the message hasn't been intercepted by a third party.

Creating new User passwords has the same problem as resetting passwords. In some embodiments, the Administrator 106 may create a User account with an email address and mobile device 116, and the system 100 may email the User with a single-use URL to the authentication server 104 that can allow the User to create his or her own password. The User may he prompted to enter a code sent to his/her mobile device 116 to authenticate him/herself. This eliminates the need for the Administrator 106 to manage User passwords. This process may also be used to reset User passwords or enroll the User in Multi-Factor Authentication.

In some environments, Users and Administrator 106s may be used to rotate their passwords on a regular basis. When a User or Administrator 106 logs into the authentication server 104 he or she may he prompted to review their contact information such as email address and mobile phone number and make changes if necessary before being able to access the Server. The Administrator 106 may set this to enable Users and Administrator 106s to review their information or change their password periodically (for example, every 90 days). If the don't verify their account data every 90 days, the Administrator 106 may set their account to be disabled. If the User or Administrator 106 does not log into the Server within that period, an email reminder may be sent and/or a Server Message may be sent to the User as a reminder.

Some authentication clients may support Server Messages sent from the Server to the client to be presented to the User when he or she authenticates. In some embodiments, the Server Message may be used to send a Banner message, Message of the Day, last login information, password due to expire, or even if the account has been locked or disabled. This message would be sent after the User authenticates with a valid Username and Password. In the case where an account has been locked or disabled, that message can be sent after the User authenticates with a valid username and password, while still preventing the User from running any commands on the client device.

In some embodiments, an email address may be configured as a part of the User record. This email address may be used to send messages to the User when his or her user settings change. It can be used to automatically email a user with a password or password set/reset link, notify them whenever there is a successful or failed login attempt with their username, or notify them when their account has been locked, or is due to expire. An email may also be sent to the User with a link to the authentication server 104 to read a transcript of their sessions after each log off.

In some high-security environments, an Administrator 106 may not trust the default encryption keys that come with the software. In these scenarios, the Administrator 106 may want to generate their own encryption key. A functionality may be provided that can allow the Administrator 106 to generate their own encryption key.

It is noted that, in some embodiments, firewall 110 can be utilized to a software or hardware-based network security system that controls the incoming and outgoing network traffic based on applied rule set. A firewall establishes a barrier between a trusted, secure internal network and another network (e.g., computer networks 102 such as the Internet etc.) that is not assumed to be secure and trusted. A firewall can also be placed before the mobile server(s) 118.

Figure 2:
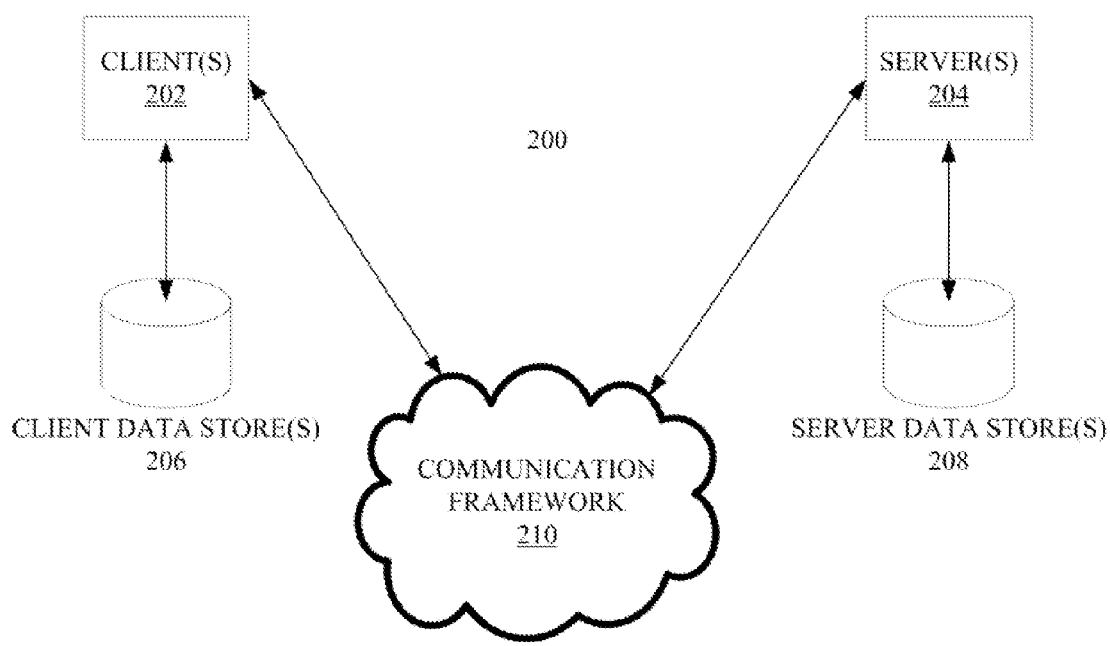
FIG. 2 is a block diagram of a sample computing environment that can be utilized to implement some embodiments.

FIG. 2 is a block diagram of a sample computing environment 200 that can be utilized to implement some embodiments. The system 200 further illustrates a system that includes one or more client(s) 202. The client(s) 202 can be hardware and/or software (e.g., threads, processes, computing devices). The system 200 also includes one or more server(s) 204. The server(s) 204 can also be hardware and/or software (e.g., threads, processes, computing devices). One possible communication between a client 202 and to server 204 may be in the form of a data packet adapted to be transmitted between two or more computer processes. System 200 includes a communication framework 210 that can be employed to facilitate communications between the client(s) 202 and the server(s) 204. Client(s) 202 are connected to one or more client data store(s) 206 that can be employed to store information local to the client(s) 202. Similarly, the server(s) 204 are connected to one or more server data store(s) 208 that can be employed to store information accessible by the server(s) 204.

In some embodiments, system 200 can be included and/or be utilized by the various systems and/or methods described herein to implement the processes and systems described herein.

Figure 3:
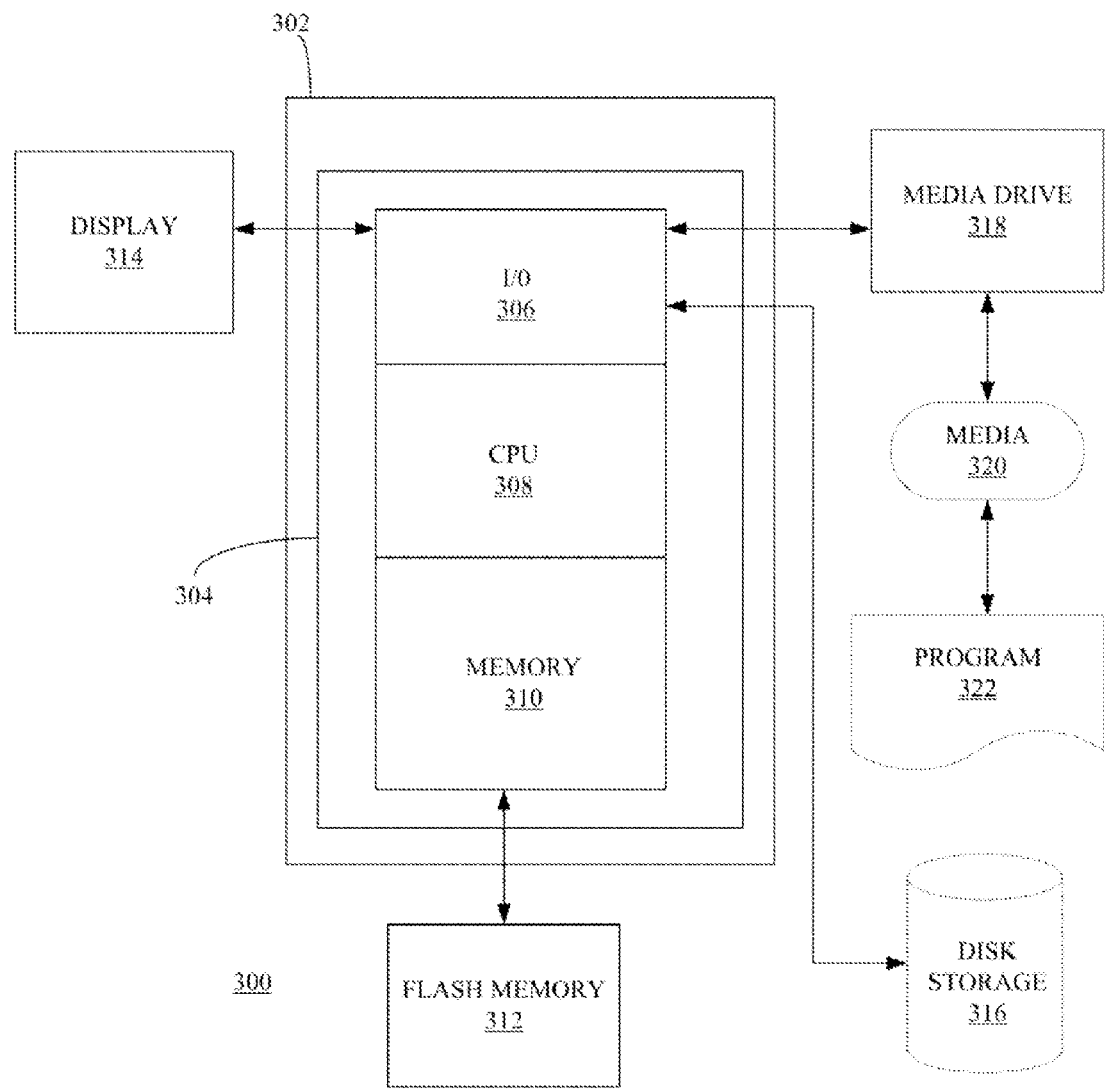
FIG. 3 depicts computing system with a number of components that may be used to perform any of the processes described herein.

FIG. 3 depicts an exemplary computing system 300 that can be configured to perform any one of the processes provided herein. In this context, computing system 300 may include, for example, a processor, memory, storage, and I/O devices (e.g., monitor, keyboard, disk drive, Internet connection, etc.). However, computing system 300 may include circuitry or other specialized hardware for carrying out some or all aspects of the processes. In some operational settings, computing system 300 may be configured as a system that includes one or more units, each of which is configured to carry out some aspects of the processes either in software, hardware, or some combination thereof.

FIG. 3 depicts computing system 300 with a number of components that may be used to perform any of the processes described herein. The main system 302 includes a motherboard 304 having an I/O section 306, one or more central processing units (CPU) 308, and a meaty section 310, which may have a flash memory card 312 related to it. The I/O section 306 can be connected to a display 314, a keyboard and/or other user input (not shown), a disk storage unit 316, and a media drive unit 318. The media drive unit 318 can read/write a computer-readable medium 320, which can contain programs 322 and/or data. Moreover, it is noted that computing system 300 can be configured to include additional systems in order to fulfill various functionalities described herein.

Example Methods

Figure 4A:
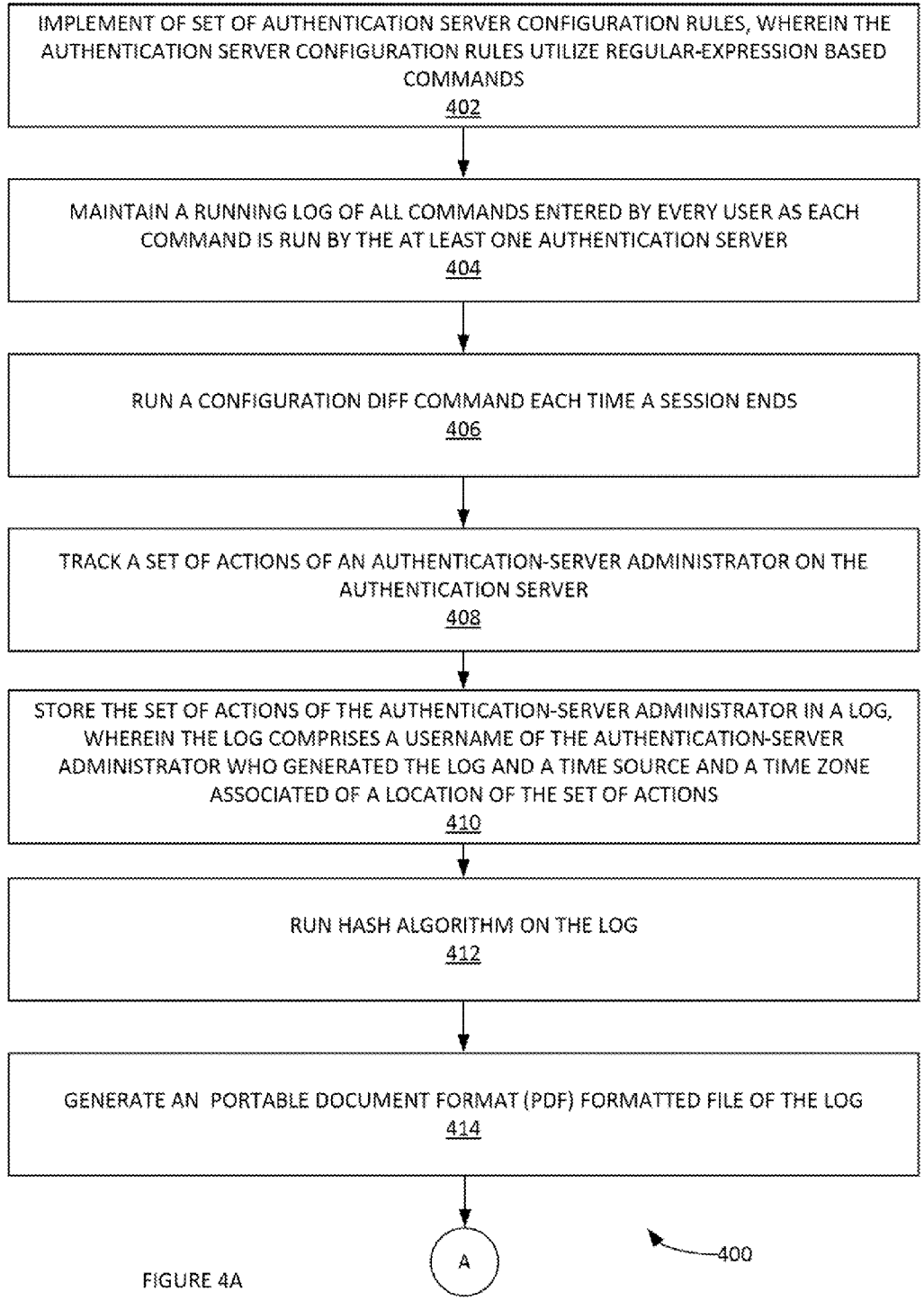
FIGS. 4A-B illustrate an example process of an authentication server, according to some embodiments.
Figure 4B:
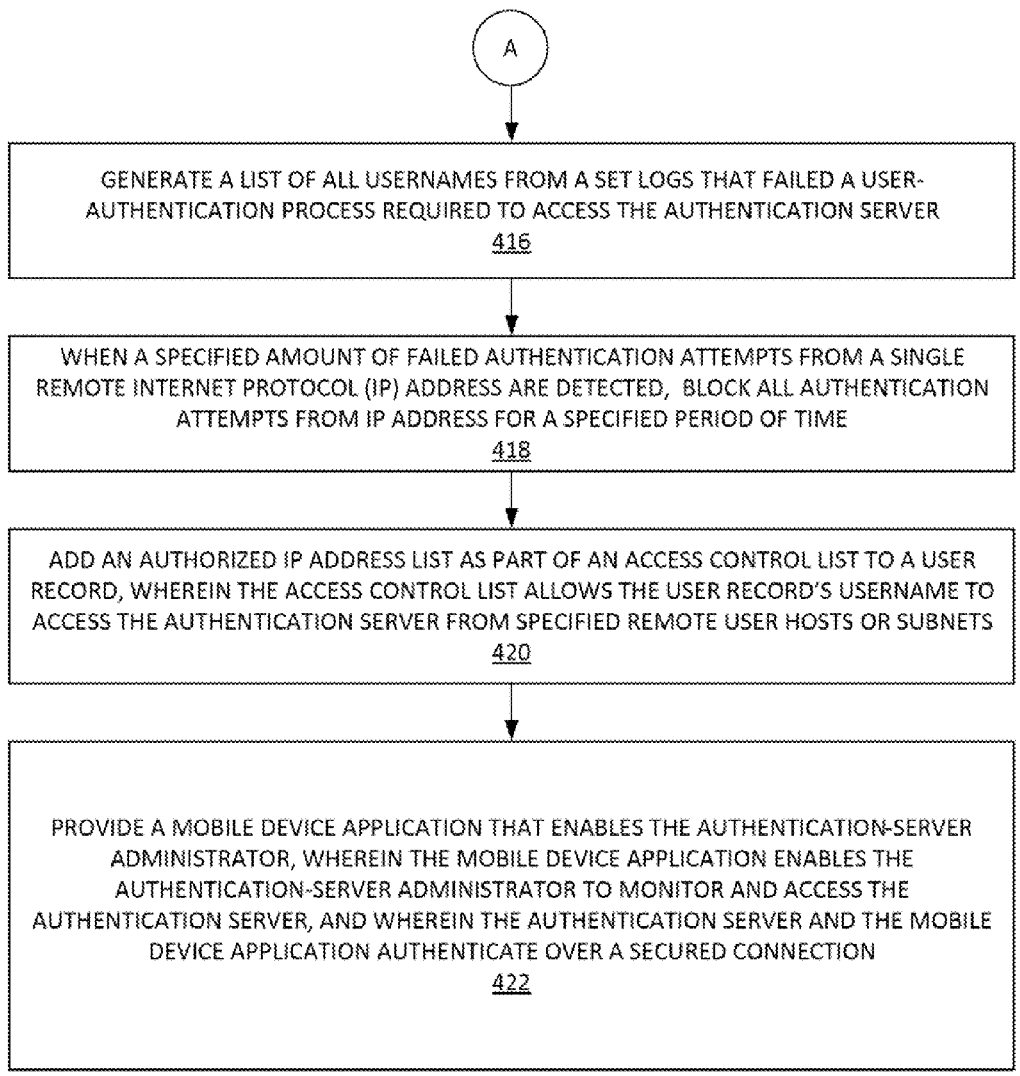

FIGS. 4A-B illustrate an example process 400 of an authentication server, according to some embodiments. In step 402, process 400 implements a set of authentication server configuration rules, wherein the authentication server configuration rules utilize regular-expression based commands. In step 404, process 400 maintains a running log of all commands entered by every user as each command is run by the at least one authentication server. In step 406, process 400 runs a configuration diff command each time a session ends. In step 408, process 400 tracks a set of actions of an authentication-server administrator on the authentication server. In step 410, process 400 stores the set of actions of the authentication-server administrator in a log, wherein the log comprises a username of the authentication-server administrator who generated the log and a time source and a time zone associated of a location of the set of actions. In step 412, process 400 runs a hash algorithm on the log. In step 414, process 400 generates a portable document format (PDF) formatted tile of the log. In step 416, process 400 generates a list of all usernames from a set logs that failed a user-authentication process required to access the authentication server. In step 418, when a specified amount of failed authentication attempts from a single remote internet protocol (IP) address are detected, process 400 blocks all authentication attempts from IP address for a specified period of time. In step 420, process 400 adds an authorized IP address list as part of an access control list to a user record, wherein the access control list allows the user record's username to access the authentication server from specified remote user hosts or subnets. In step 422, process 400 provides a mobile device application that enables the authentication-server administrator, wherein the mobile device application enables the authentication-server administrator to monitor and access a proxy server with access to the authentication server, and wherein the authentication server and the mobile device application authenticate to the proxy server over a secured connection.

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, Java, Python) or some specialized application-specific language (PHP, Java Script, JSON, XML).

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A network-layer authentication server method comprising:
   with at least one authentication server:
   implementing a set of authentication server configuration rules, wherein the authentication server configuration rules utilize regular-expression based commands, wherein the regular-expression based commands are used to match a set of host names of clients or an internet protocol (IP) address client identifier or a client-configuration command, the regular-expression based commands comprise a permit-deny statement on any part of the client-configuration command, and wherein the regular-expression based commands are used to match on the set of host names of clients instead in lieu of the IP address client identifier;
   maintaining a running log of all commands entered by every user as each command is run by the at least one authentication server:
   running a configuration diff command each time a session ends;

tracking a set of actions of an authentication server administrator on the authentication server:

storing the set of actions of the authentication server administrator in a log, wherein the log comprises a remote IP address of the authentication server administrator who generated the log and a time source and a time zone associated of a location of the set of actions;

running a hash algorithm on the log to verify that an original message has not been modified;

generating a portable document format (PDF) formatted file of the log;

generating a list of all remote IP addresses from a set of logs that failed a user-authentication process required to access the authentication server;

when a specified amount of failed authentication attempts from a single remote internet protocol (IP) address are detected, blocking all authentication attempts from the single remote IP address for a specified period of time;

adding an authorized IP address list as part of an access control list to a user record, wherein the access control list allows the user record's username to access the authentication server from specified remote user hosts or subnets; and providing a mobile device application that enables the authentication server administrator, wherein the mobile device application enables the authentication server administrator to monitor and access a proxy server with access to the authentication server, and wherein the authentication server and the mobile device application authenticate to the proxy server over a secured connection.

2. The authentication server method of claim 1, wherein the configuration diff command is emailed to the authentication server administrator.

3. The authentication server method of claim 1, wherein the user record comprises an access control list of specified client devices that can access the authentication server when also associated with the authorized IP address.

4. The authentication server method of claim 1, wherein the authentication server sends an alerts to the mobile device application through the proxy server, wherein the alert comprises information about an authentication server maintenance report, an authentication server access log or an authentication server view statistic.

5. The authentication server method of claim 4, wherein a remote authentication server commands can be communicated from the mobile device application to the proxy server and then forwarded to the authentication server for implementation.

6. A computerized system of a network-layer server comprising:

at least one processor operating in the authentication server is configured to execute instructions;

a memory including instructions when executed on the at least one processor, causes the processor to perform;

implement a set of authentication server configuration rules, wherein the authentication server configuration rules utilize regular-expression based commands, wherein the regular-expression based commands are used to match a set of host names of clients or an internet protocol (IP) address client identifier or a client-configuration command. the regular-expression based commands comprise a permit-deny statement on any part of the client-configuration command, and wherein the regular-expression based commands are used to match on the set of host names of clients instead in lieu of the IP address client identifier;

maintain a running log of all commands entered by every user as each command is run by the at least one authentication server:

run a configuration diff command each time a session ends;

track a set of actions of an authentication server administrator on the authentication server:

store the set of actions of the authentication server administrator in a log, wherein the log comprises a remote IP address of the authentication server administrator who generated the log and a time source and a time zone associated of a location of the set of actions;

run a hash algorithm on the log to verify that an original message has not been modified;

generate a portable document format (PDF) formatted file of the log;

generate a list of all remote IP addresses from a set of logs that failed a user-authentication process required to access the authentication server;

when a specified amount of failed authentication attempts from a single remote IP address are detected, block all authentication attempts from the single remote IP address for a specified period of time;

add an authorized IP address list as part of an access control list to a user record, wherein the access control list allows the user record's username to access the authentication server from specified remote user hosts or subnets; and provide a mobile device application that enables the authentication server administrator, wherein the mobile device application enables the authentication server administrator to monitor and access a proxy server with access to the authentication server, and wherein the authentication server and the mobile device application authenticate to the proxy server over a secured connection.

7. The computerized system of claim 6, wherein the configuration diff command is emailed to the authentication server administrator.

8. The computerized system of claim 6, wherein the user record comprises an access control list of specified client devices that can access the authentication server when also associated with the authorized IP address.

9. The computerized system of claim 6, wherein the authentication server sends an alerts to the mobile device application through the proxy server, wherein the alert comprises information about an authentication server maintenance report, an authentication server access log or an authentication server view statistic.

10. The computerized system of claim 9, wherein a remote authentication server commands can be communicated from the mobile device application to the proxy server and then forwarded to the authentication server for implementation.

* * * * *